United States Patent [19]

Maloney

[11] Patent Number: 4,647,270
[45] Date of Patent: Mar. 3, 1987

[54] TRANSPORTING UNIT FOR TRUCKS AND THE LIKE

[76] Inventor: Michael J. Maloney, 4800 Oxborough La., Bloomington, Minn. 55437

[21] Appl. No.: 630,942

[22] Filed: Jul. 16, 1984

[51] Int. Cl.[4] ............................................. B65G 67/02
[52] U.S. Cl. ..................................... 414/470; 296/61; 414/537
[58] Field of Search ............... 414/537, 538, 469, 470; 410/104, 105; 298/7; 296/61

[56] References Cited

U.S. PATENT DOCUMENTS

| | | | |
|---|---|---|---|
| 3,307,719 | 3/1967 | Martin | 414/537 |
| 3,834,565 | 9/1974 | Goodman et al. | 414/537 |
| 3,866,771 | 2/1975 | Reid et al. | 414/537 |
| 3,870,170 | 3/1975 | Noble et al. | 414/537 |
| 4,020,957 | 5/1977 | Wren | 414/537 |
| 4,049,229 | 9/1977 | Peisner | 410/105 |
| 4,088,235 | 5/1978 | Thacker | 414/537 |

Primary Examiner—Joseph E. Valenza
Assistant Examiner—David A. Bucci

[57] ABSTRACT

A transporting unit includes a horizontal section which is mounted to a truck and functions as the bed for the truck. A beaver tail section extends downwardly from the horizontal section and a foldable ramp section is hinged to the beaver tail section.

13 Claims, 15 Drawing Figures

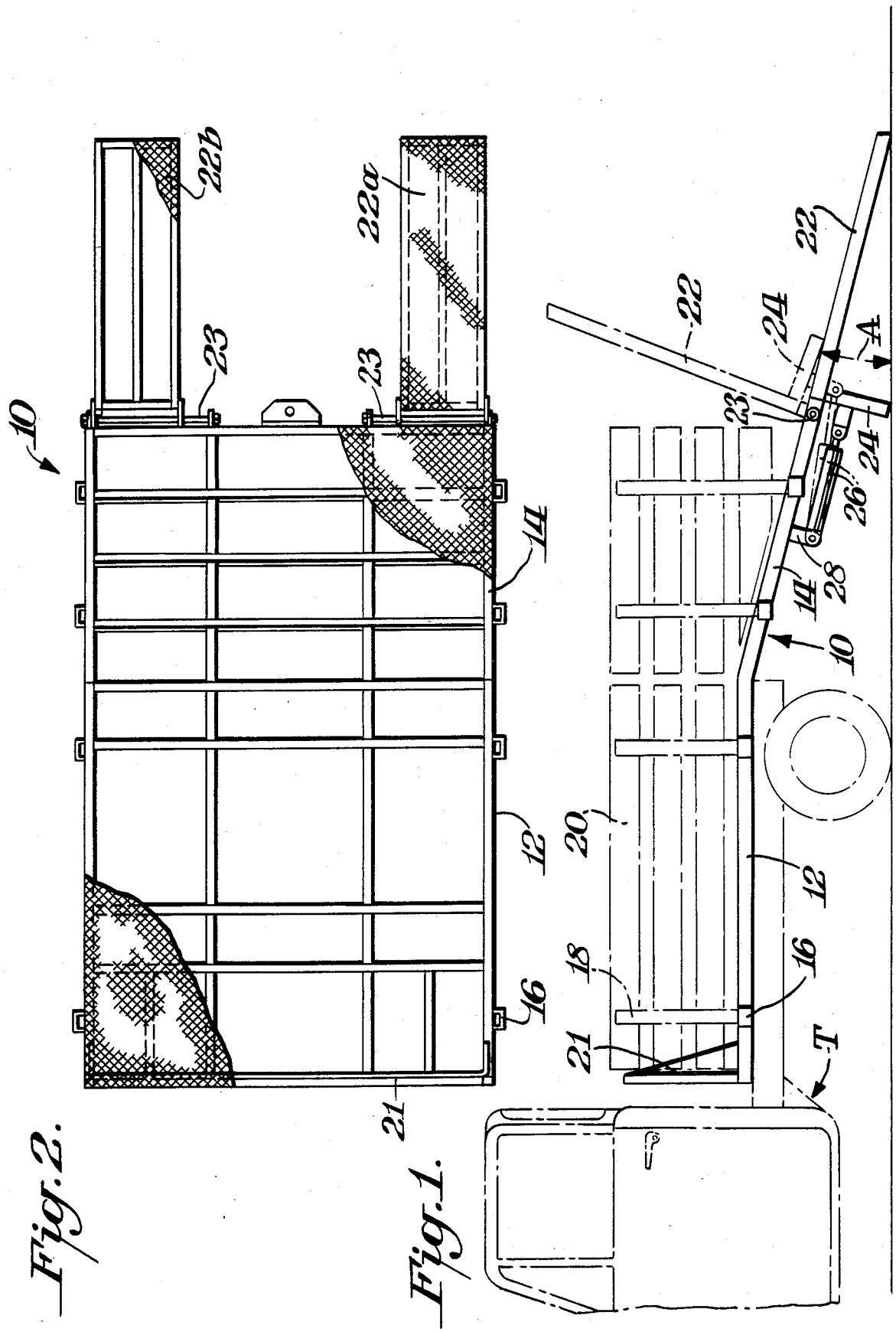

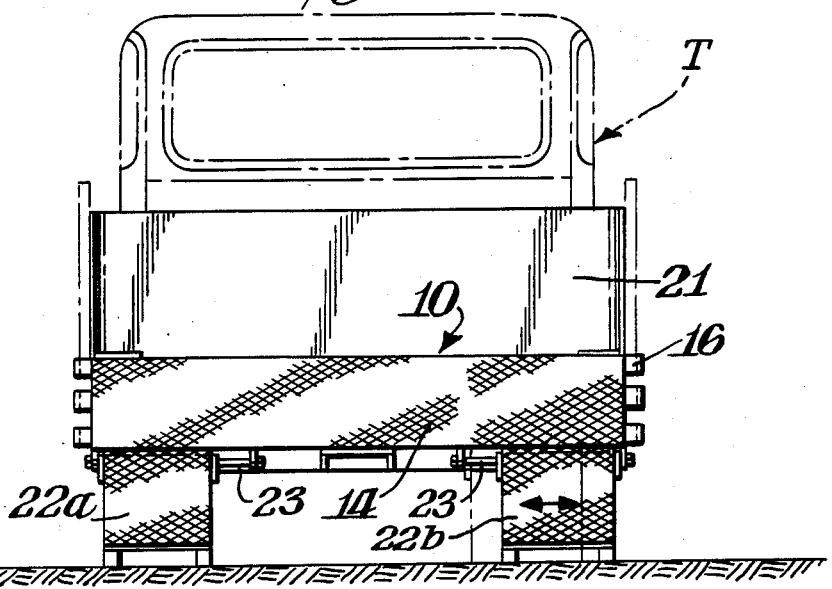
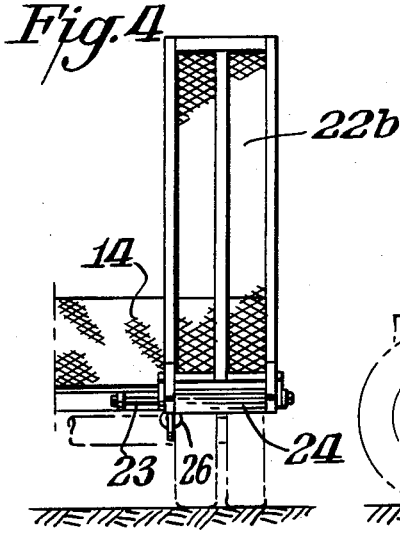
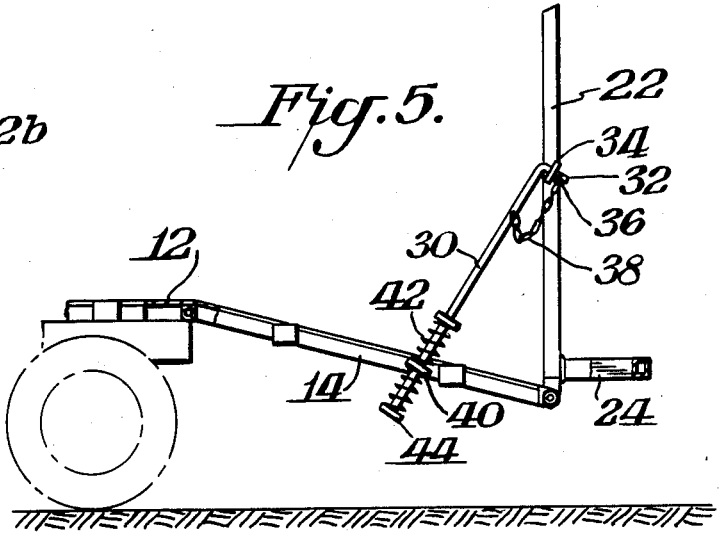
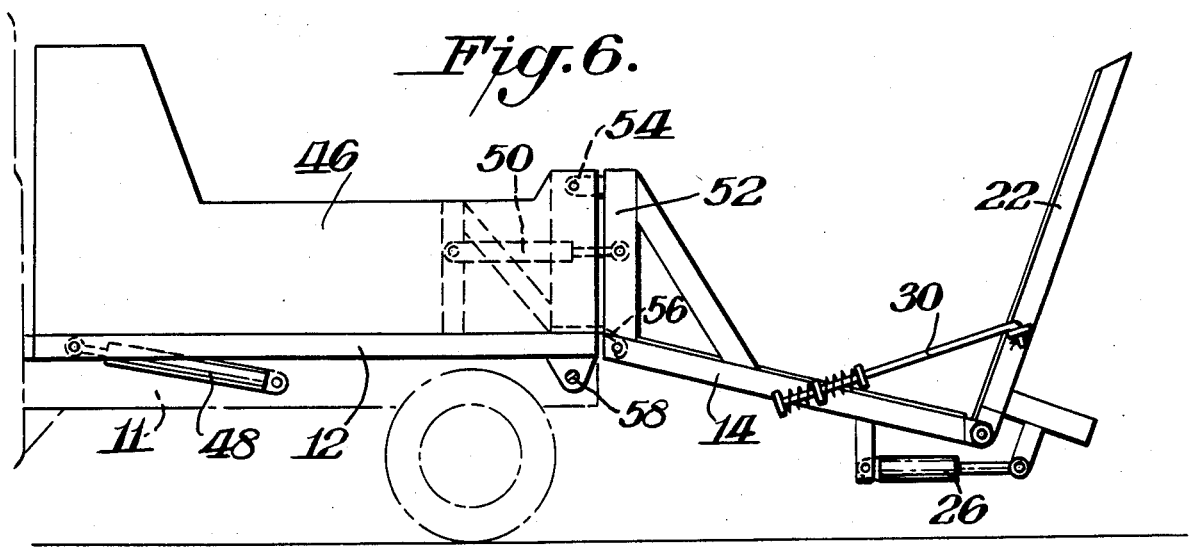

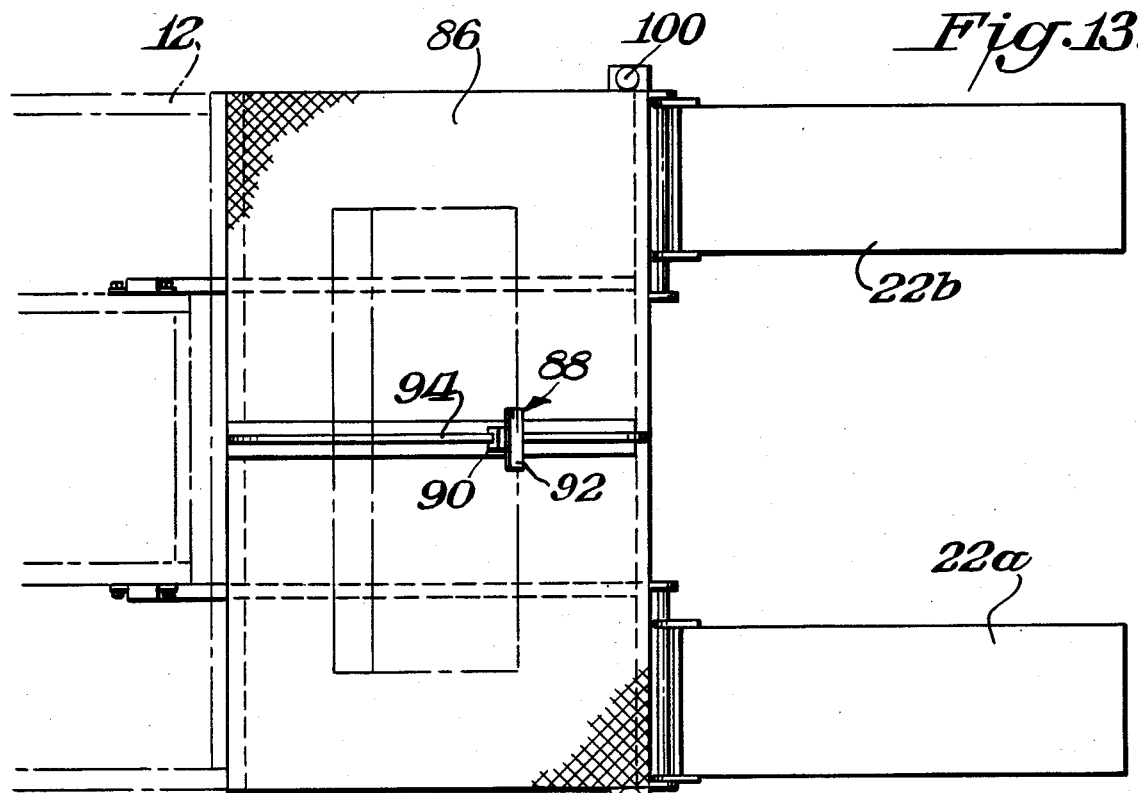
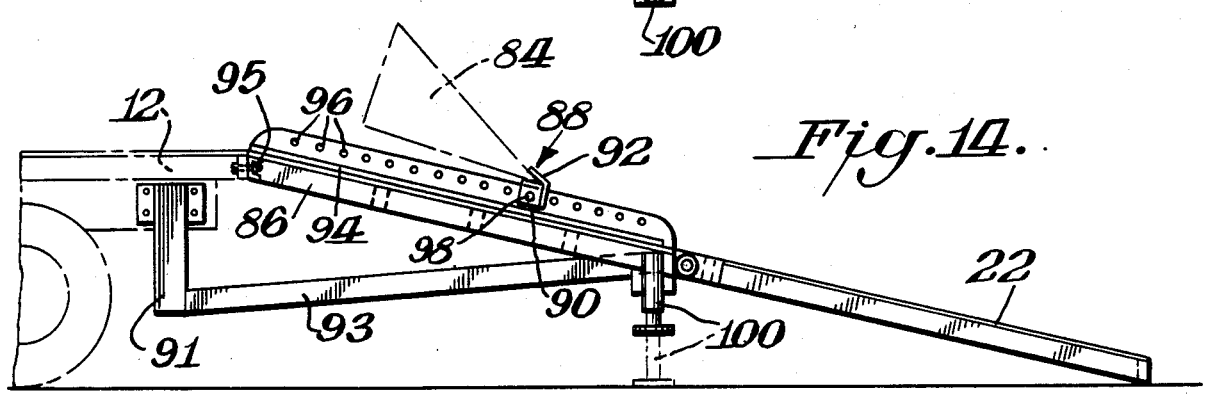
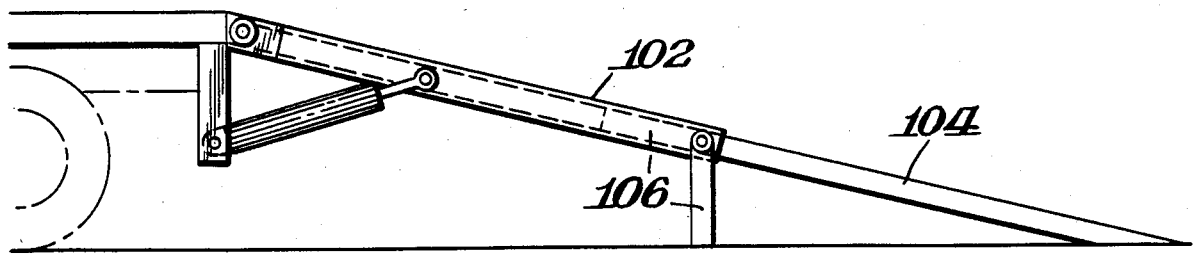

TRANSPORTING UNIT FOR TRUCKS AND THE LIKE

BACKGROUND OF THE INVENTION

Trucks and trailers are conventionally used for hauling laods of various types. One of the problems with a truck/trailer combination is the difficulty of controlling the movements of the combination, whereas a truck with a specialized truck bed can be easily maneuvered. Another problem with prior approaches is the difficulty in being able to get to relatively inaccessible areas so that the equipment or other loads would be near the truck. Another consideration is that once the truck is at the desired location, the user would be able to move the equipment or load onto the truck bed. Frequently ramps of various types have been used for this purpose. Generally after the load has been moved to the truck, the ramp must be put into a non-use condition—this means either disassembling the ramp or somehow elevating the ramp and securing it to the truck so that it can be stored during periods of non-use.

SUMMARY OF THE INVENTION

An object of this invention is to provide a transporting unit which can be conveniently mounted to a truck to function both as a bed for the truck and also as a ramp whereby equipment or other loads can be conveniently loaded onto the truck.

Another object of this invention is to provide such a transporting unit which permits the safe and reliable hauling of heavy equipment.

A further object of this invention is to provide a transporting unit which eliminates the necessity for costly trailers and maximizes the accessibility of the transporting unit to thereby minimize hard-to-get-at areas.

In accordance with this invention, the transporting unit comprises a first section which is mounted directly to a truck or the like and thereby functions as the truck bed. Mounted to the front or bed section at an angle thereto is a beaver tail section which in turn is hinged to a ramp section. The ramp section rests on the ground. When both inclined sections are aligned in the loading condition of the truck, the aligned sections form a shallow angle preferably 13° with the ground.

Means are provided for folding the second ramp section backwards toward the beaver tail section so that the ramp section is elevated above the ground during periods of non-loading use so that the truck may then transport the load to any desired location without the necessity of detaching the ramp.

THE DRAWINGS

FIG. 1 is a side view in elevation of the transporting unit in accordance with this invention showing the unit mounted on a truck;

FIG. 2 is a top plan view of the transporting unit shown in FIG. 1;

FIG. 3 is a rear end view in elevation of the transporting unit shown in FIGS. 1-2;

FIG. 4 is a rear view in elevation of a portion of the transporting unit shown in FIGS. 1-3;

FIG. 5 is a side view in elevation showing a portion of a modified form of transporting unit;

FIG. 6 is a side view in elevation showing yet another modified form of transporting unit shown in accordance with this invention;

FIG. 13 is a top plan view of yet another form of transporting unit in accordance with this invention;

FIG. 14 is a side elevation view of the transporting unit shown in FIG. 13; and

FIG. 15 is a side elevation view showing yet another modified form of transporting unit in accordance with this invention.

DETAILED DESCRIPTION

Figure 7:
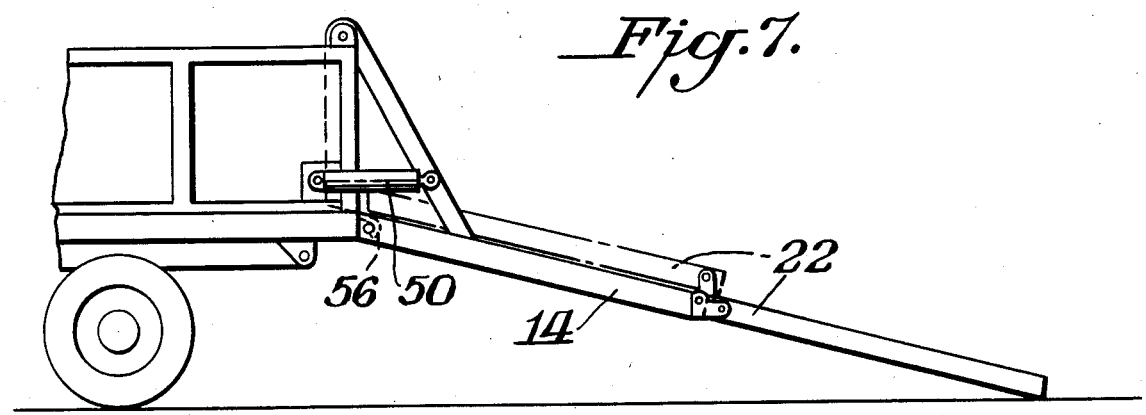
FIG. 7 is a side elevation view of a modified form of transporting unit in accordance with this invention.

FIGS. 1-3 illustrate a transporting unit 10 in accordance with this invention. As illustrated therein, transporting unit 10 includes a first horizontal section 12 which is mounted directly on a truck T and functions as the truck bed. Integrally extending from horizontal section 12 is an inclined or beaver tail section 14 which also may be of the same general structure as horizontal bed section 12 (see, FIG. 2) so that in effect beaver tail section 14 is not only a ramp in the sense of permitting loads to be moved onto the flat section, but also beaver tail section 14 may function as an extended bed section of the truck. Various means are provided to couple the bed sections 12, 14 with the truck. For example, FIGS. 1-3 indicate the transporting unit 10 to include channels or other coupling devices 16 which would fit over stakes 18 on the truck. Thus not only would the transporting unit 10 be coupled to the truck by virtue of this interengagement, but also the stakes would form part of the side walls 20 for the truck body. Detachable U-shaped plate 21 would form the back wall.

As shown in FIGS. 1-2, a further ramp section 22 is hingedly connected to beaver tail section 14. Ramp section 22 rests on the ground and is in line with beaver tail section 14 so that equipment or other loads may be conveniently moved up ramp section 22 and beaver tail section 14 and then onto horizontal section 12.

Ramp section 22 may take any suitable form. In the illustrated embodiment, ramp section 22 is in the form of a pair of legs 22a, 22b. If desired, a one-piece section may be of any suitable size or shape including, for example, a trapazoidal shape wherein the narrow end rests on the ground. As shown in FIG. 1, ramp section 22 forms a shallow angle A with the ground. Angle A is, for example, between 10° and 16°, and preferably 13° since this provides the optimum angle for moving a load onto the truck bed while still taking the height and space requirements into account.

Advantageously ramp section 22 is detachably connected to beaver tail section 14 by removable hinge pins 23. This detachable mounting permits ready replacement of ramp legs 22a, 22b should it be desired to use a different size or different shaped ramp section. As best shown in FIG. 3, hinge pins 23 are made longer than the width of ramp legs 22a, 22b. Accordingly ramp legs 22a, 22b may be shifted on brackets 25 horizontally with respect to beaver tail section 14. This lateral shifting permits ramp legs 22a, 22b to be precisely positioned to accommodate any specific load. Thus, for example, the ramp legs may be positioned to conform to the spacing between the wheels of heavy equipment that might be rolled up section 22. After ramp legs 22a, 22b are shifted to their intended position, the ramp legs may be held in any suitable adjustable locking elements movably mounted on hinge pins 23 or the ramp may be held in place under its own weight.

The use of spaced legs 22a, 22b for ramp section instead of continuous section is also desirable because the spacing between the legs permits the vehicle tail lights to be clearly visible when ramp section 22 is in its folded condition.

As shown in FIG. 1, each ramp leg is provided with a U-shaped support 24 which may take any suitable form such as a plate or post connected perpendiculary to its ramp section 22. As also shown in FIG. 1, a hydraulic piston cylinder mechanism 26 is connected to support 24 and to an extension 28 from beaver tail section 14.

Mechanism 26 serves the dual function of folding ramp section 22 upon the beaver tail or inclined section 14 during periods of non-loading use and also of holding the ramp sections in the inclined stored condition. FIG. 1, for example, shows in phantom ramp section 22 elevated in its stored condition as well as supports 24 being elevated so that the truck may be driven with the ramp folded to a position of non-interference. As is also apparent, mechanism 26 is hingedly connected to support 24 and extension 26 to permit this folding action.

In operation, transporting unit 10 would be mounted to truck T in any suitable manner and locked thereto by any suitable means. Ramp 22 would be in the folded condition shown in phantom in FIG. 1. Truck T would then be driven to any suitable site where it is desired to load the truck. Mechanism 26 would then be actuated so that ramp 22 is moved to the position shown in full lines in FIG. 1. Heavy equipment or other loads may then be moved up ramp 22 onto beaver tail or inclined position 14 and then onto horizontal section 12. Any suitable means may then be utilized to secure the load in place during later transportation on truck T. After truck T has been sufficiently loaded, ramp 22 would then be folded to its nonuse condition, and the load could be taken wherever desired.

FIG. 5 illustrates a variation of the invention wherein the hydraulic mechanism is replaced by a manual locking arrangement in the form of a rod 30 having hook extension 32 which may be placed in a ring or other opening 34 provided on ramp 22. Hook extension 32 could then be locked in place in any suitable manner such as by a cotter pin 36 connected to chain 38 for a quick connect and quick disconnect. As shown in FIG. 5, chain 38 would be permanently secured at its opposite end to rod 30. Rod 30 would also be secured to a mounting bracket 40 provided on beaver tail section 14 with a tension spring 42 disposed around rod 30, the tension rod of which is regulated by adjustment nut 44.

FIG. 6 shows yet another alternative form of this invention which is particularly designed for use as a dump truck. As shown therein, a dump box 46 would be secured to horizontal section 12 with a hydraulic lifting device 48 (attached at its other end to truck frame 11) provided for elevating the dump box. A further lifting device 50 would connect the dump box 46 to a vertical extension 52 secured to beaver tail or inclined section 14. Lifting mechanism 50 would permit a raising of the beaver tail 14 by extending the piston from the cylinder of mechanism 50. FIG. 6 also illustrates the inclusion of both a ramp cylinder 26 as well as the ramp safety lock or rod 30. The embodiment of FIG. 6 also differs from FIG. 1 in that the beaver tail is hinged at hinge pin 54 to horizontal section 12 rather than being integral in FIG. 1. As also shown in FIG. 6, a beaver tail lock bar 56 is provided to assure connection of the beaver tail 14 with horizontal 12 during conditions of loading use. FIG. 6 further illustrates hinge pin 58 for the dump box 46, attached to truck frame 11.

Figure 8:
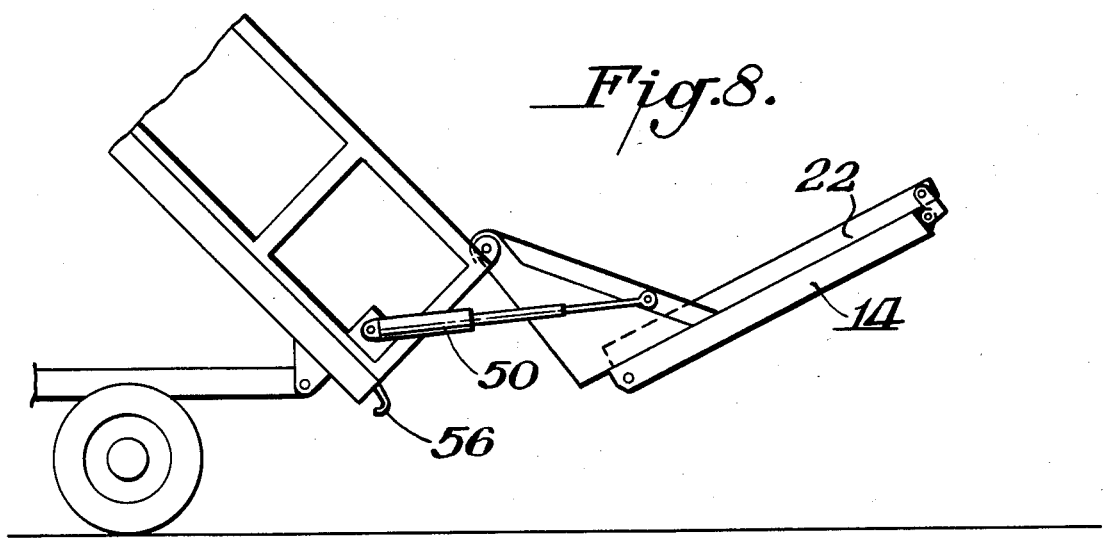
FIG. 8 is a side elevation view showing the transporting unit of FIG. 7 in a different phase of operation.

FIGS. 7–8 show a further modification of this invention wherein the ramp section 22 is manually foldable upon beaver tail 14 as shown in phantom in FIG. 7 and as shown in FIG. 8.

Figure 9:
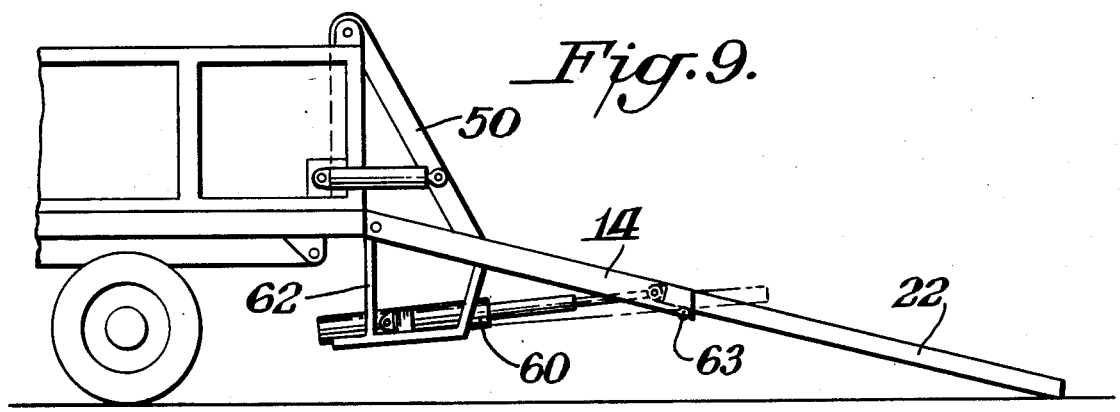
FIG. 9 is a side elevation view similar to FIG. 7 of yet another modified form of transporting unit in accordance with this invention.

FIG. 9 shows a variation of the embodiment of FIGS. 7–8 wherein a hydraulic cylinder 60 is mounted between frame extension 62 from beaver tail 14 and ramp section 22. Actuation of hydraulic cylinder 60 in effect causes ramp section 22 to retract over roller 63 to be stored on frame 62.

Figure 10:
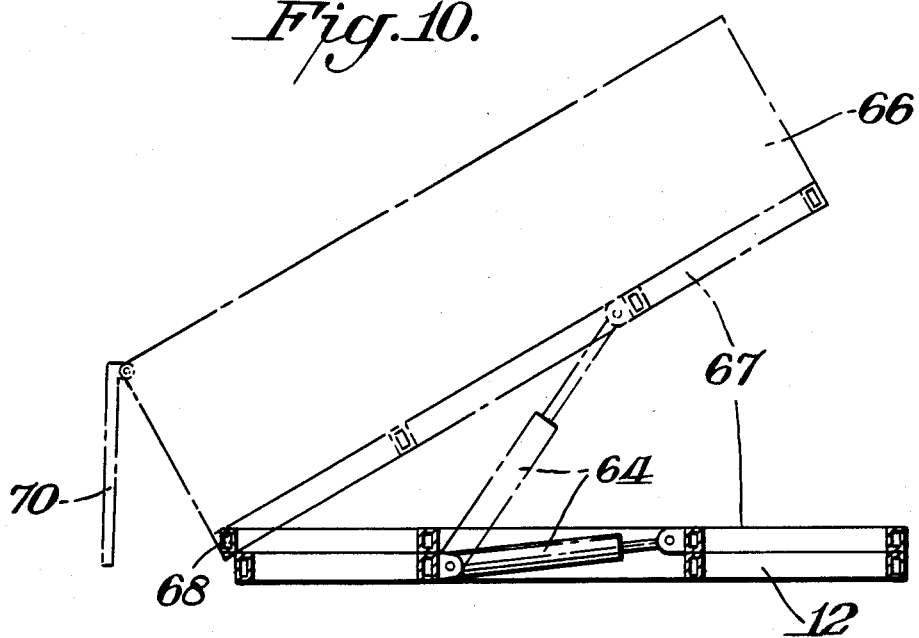
FIG. 10 is an elevation view partly in section of a transporting unit in accordance with this invention designed for side dumping.

As should be apparent, the various concepts of this invention may be practiced in numerous ways. FIG. 10, for example, shows a variation wherein the invention is utilized for side dumping. In this variation, horizontal section 12 has attached thereto hydraulic cylinder 64, which is provided for tilting dump box floor 67 about is pivot 68 to permit a side dumping. FIG. 10 also shows the tail gate 70 along the side wall of the dump box. Dump box 66 could, of course, be dimensioned in any suitable manner and could include side boards which are relatively short in height or could be dimensioned for higher side boards. When not used as a dump bed, dump box 66 could set flat on the truck frame (not shown), and could be used as a flat bed.

Figure 11:
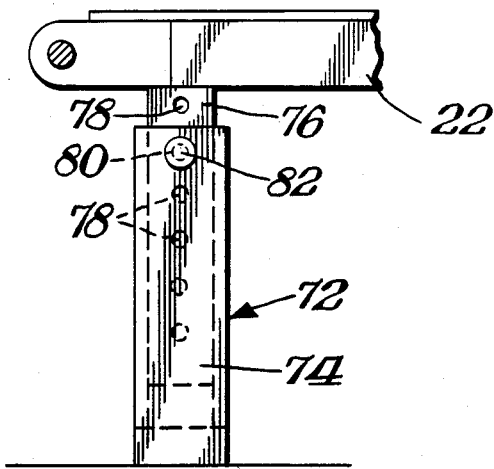
FIG. 11 is a side elevation view of a portion of a transporting unit in accordance with this invention.
Figure 12:
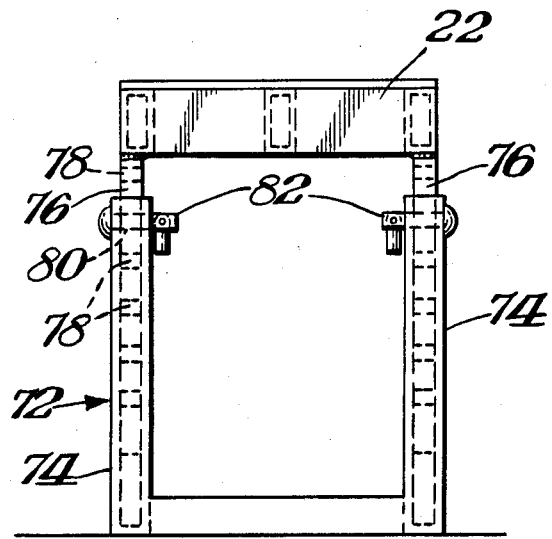
FIG. 12 is a front elevation view of the portion shown in FIG. 11.

FIGS. 11–12 show a further feature of this invention which may be utilized in any of the various embodiments. In this feature the support 24, previously described, would be in the form of a support 72 which is vertically adjustable by providing an outer shell 74 and an inner leg 76 which telescopes into outer shell 74. Inner leg 76 has a series of holes 78 which are positioned for alignment with a hole 80 in outer shell 74 so that the desired height adjustment may be achieved by aligning hole 80 with one of the holes 78 and then inserting any suitable fastener 82 therethrough to lock the support in position. As shown in FIG. 12, support 72 may be of a U-shaped frame form.

Another feature of this invention is that the front portion of horizontal section 12 may be utilized for storage of auxiliary equipment such as a built-in diesel tank.

FIGS. 13–14 show another variation of this invention which is particularly designed for transporting heavy equipment such as front end loaders. As illustrated therein, the bucket 84 (shown in phantom) of a front end loader would extend over beaver tail 86. Beaver tail 86 in turn is provided with a lock member 88 in the from of a slide member 90 having upwardly inclined free arm 92. Beaver tail 86 includes a rail 94 upon which slide member 90 is movably mounted. Rail 94 includes a series of holes 96 so that a hole 96 in slide member 90 may be aligned with one of holes 96 and then locked in place. In operation slide member 90 would be moved toward the remote end of rail 94 until bucket 84 is positioned in place. Slide member 90 would then be moved toward bucket 84 until its arm 92 is positioned above bucket 84 whereupon slide member 90 would then be locked in place by any suitable fastener extending through hole 90 and an appropriate hole 96.

FIGS. 13-14 illustrate the feature of detachably mounting beaver tail 86 to an existing truck bed. Any suitable means could be used such as bracket 91 connected to cantilever arm 93 and to the truck frame with a channel 95 of beaver tail 86 being connected to the truck bed.

FIG. 14 also shows a variation of this invention wherein support leg 100 is in the form of a hydraulic cylinder which has the double advantage of permitting height adjustment as well as facilitating storage of the support leg by retracting the piston into the cylinder.

FIG. 15 illustrates yet a further variation of this invention wherein beaver tail 102 is hollow so that during periods of non-use ramp section 104 may telescope into beaver tail 102 as shown in phantom. Similarly FIG. 15 illustrates support leg 106 to be pivotally mounted to beaver tail 102 so that support leg 106 may rotate to its position of non-use.

As indicated, various individual features of this invention are usable in various embodiments. For example, the beaver tail may be elevated to a horizonal position in line with the horizontal section to provide an extended flat bed area or the beaver tail may remain inclined to provide an inclined bed area. Additionally the ramp section could be designed as an add on section which could be conveniently detached so that the ramp section could be stored at the side or under the truck. As also previously indicated, the ramp section could be in the form of individual legs which are fixed or slidably mounted or could be in the form of a full ramp. Additionally the ramp section could be pivoted to a vertical position to function as a tail gate for the truck.

Transporting unit 10 may be made in various sizes and of various materials. For example, the bed may be formed from corrugated steel and diamond plate. Additionally, rectangular steel tubing and/or channel iron may be utilized. Transporting unit 10 may be constructed so as to be easily adaptable to various trucks such as ¾ and one ton truck beds with 10,000-12,000 pounds gross weight capacity for one ton trucks and 8,000 to 10,000 pound gross weight capacity on ¾ ton trucks. As is apparent, transporting unit 10 thereby provides a convenient means of loading and unloading equipment which can be done in a safe and reliable manner.

What is claimed is:

1. A transporting unit in combination with a truck or the like for loading the truck and then transporting the load, said truck including a cab, a chassis connected to an extending rearwardly of said cab, said chassis comprising the frame of the truck, said transporting unit comprising a horizontal section, said horizontal section comprising the floor of a dump box having first and second hinge means and being provided with dump box lifting means, said transporting unit further comprising means for detachably coupling said horizontal section to said frame of said truck whereby said floor of the dump box may function as the truck bed and whereby said unit may be selectively detached from said frame for attachment to another truck and for replacement by another transporting unit, a beaver tail section extending downwardly away from said horizontal section, a ramp section pivotally connected to said beaver tail section, said ramp section forming a shallow angle with the ground when said transporting unit is in its loading condition, support means secured to and below said ramp section to rest on the ground and support said ramp section when said transporting unit is in its loading conditon, lifting means connected to said ramp section for pivoting said ramp section upwardly toward said beaver tail section to dispose said ramp section in an elevated folded position when said transporting unit is in its non-loading condition, and locking means for maintaining said ramp section in its folded position; said first hinge means connecting said dump box to said truck frame, said dump box lifting means reacting between said dump box and said truck to pivot said dump box about said first hinge means, said second hinge means connecting said beaver tail section to said dump box, and said transporting unit being provided with means reacting between said beaver tail section and said dump box to pivot said beaver tail section about said second hinge means.

2. The transporting unit of claim 1 wherein each of said horizontal section and said beaver tail section comprises a continuous planar surface whereby both of said horizontal section and said beaver tail section may function as said truck bed.

3. The transporting unit of claim 2 wherein said ramp section is detachably mounted to said beaver tail section, and said ramp section being in line with said beaver tail section when said transporting unit is in its loading condition.

4. The transporting unit of claim 3 wherein said ramp section comprises a pair of spaced legs, and said leg sections being horizontally adjustable with respect to said beaver tail section.

5. The transporting unit of claim 3 wherein said lifting means comprises a hydraulic cylinder mechanism connected to and reacting between said ramp section and said beaver tail section.

6. The transporting unit of claim 4 wherein each of said legs is secured to said beaver tail section by being slidably mounted on removable hinge pins, and each of said hinge pins being longer than the width of its said ramp leg to permit a lateral shifting of its said ramp leg.

7. The transporting unit of claim 1 wherein said first hinge means is remote from the cab of said truck for end dumping.

8. The transporting unit of claim 1 wherein said first hinge means is along the side of said truck frame perpendicular to the cab of said truck for side dumping.

9. The transporting unit of claim 1, wherein said shallow angle is about 13°.

10. A transporting unit for use with a truck or the like for loading the truck and then transporting the load comprising a horizontal section, means for detachably coupling said horizontal section to the frame of a truck whereby said horizontal section may function as the truck bed, a beaver tail section extending downwardly away from said horizontal section, a ramp section pivotally connected to said beaver tail section, said ramp section forming a shallow angle with the ground when said transporting unit is in its loading condition, support means secured to and below said ramp section to rest on the ground and support said ramp section when said transporting unit is in its loading condition, lifting means connected to said ramp section for pivoting said ramp section upwardly toward said beaver tail section to dispose said ramp section in an elevated folded position when said transporting unit is in its non-loading condition, locking means for maintaining said ramp section in its folded position, each of said horizontal section and said beaver tail section comprising a continuous planar surface whereby both of said horizontal section and said beaver tail section may function as said truck bed, said ramp section being detachably mounted to said beaver tail section, said ramp section being in line with said beaver tail section when said transporting unit is in its loading condition, said horizontal section comprising the floor of a dump box, first hinge means connecting said dump box to said truck frame, dump box lifting means reacting between said dump box and said truck to pivot said dump box about said first hinge means, second hinge means connecting said beaver tail section to said dump box, and means reacting between said beaver tail section and said dump box to pivot said beaver tail section about said second hinge means.

11. The transporting unit of claim 10 wherein said first hinge means is remote from the cab of said truck for end dumping.

12. The transporting unit of claim 10 wherein said first hinge means is along the side of said truck frame perpendicular to the cab of said truck for side dumping.

13. The transporting unit of claim 10, wherein said shallow angle is about 13°.

* * * * *